United States Patent [19]

Tanaka

[11] 4,403,261

[45] Sep. 6, 1983

[54] METHOD AND APPARATUS FOR EDITING DIGITAL SIGNAL

[75] Inventor: Masato Tanaka, Tokyo, Japan

[73] Assignee: Sony Corporation, Tokyo, Japan

[21] Appl. No.: 297,252

[22] Filed: Aug. 28, 1981

[30] Foreign Application Priority Data

Aug. 28, 1980 [JP] Japan .............................. 55-118858

[51] Int. Cl.³ .................... G11B 27/02; G11B 5/00
[52] U.S. Cl. ......................................... 360/13; 360/32
[58] Field of Search ................ 360/13, 32; 371/2, 30, 371/49

[56] References Cited

U.S. PATENT DOCUMENTS

| 4,146,099 | 3/1979 | Matsushima et al. | 360/32 |
| 4,238,852 | 12/1980 | Iga et al. | 360/32 |
| 4,309,726 | 1/1982 | Tanaka et al. | 360/32 |
| 4,352,129 | 9/1952 | Baldwin | 360/32 |

Primary Examiner—Vincent P. Canney

Attorney, Agent, or Firm—Lewis H. Eslinger; Alvin Sinderbrand

[57] ABSTRACT

Electronic editing of a recording digital signal is carried out such that any errors created by the editing process are correctable. The digital signal is given protection from errors, for example by a cross-interleaving technique, so that multiple errors in a code sequence length can be corrected when the signal is reproduced. The edit cut-in and cut-out points are controlled so that if multiple editing is carried out, fewer than m+1 errors will be generated, and the edited signal will be free of clicks caused by uncorrectable error. The permitted points for cut-in and cut-out can be separated by a distance greater than the code sequence length. Alternatively, if cross-interleaving is carried out such that digital words are grouped into blocks and provided with respective different delays that are integral multiples of D block lengths, the interval between such points can be selected to correspond to T block lengths, such that the least common multiple of D and T is greater than the code sequence length.

13 Claims, 26 Drawing Figures

| SYNC | W"₁₂ | W"₁₀ | W"₈ | W"₆ | W"₄ | W₂ | Q'₂ | Q'₁ | P"₂ | P"₁ | W"₁₁ | W"₉ | W"₇ | W"₅ | W"₃ | W₁ | CRC CODE |

FIG-17D (CRR)

METHOD AND APPARATUS FOR EDITING DIGITAL SIGNAL

BACKGROUND OF THE INVENTION

1. Field of the Invention

This invention relates to a method and apparatus for editing digital signals which are recorded on a record medium, and is more particularly directed to a method and apparatus wherein digital signals such as PCM-encoded audio signals are edited electronically in an insert or assemble mode of electronic editing.

2. Description of the Prior Art

There have been proposed PCM recording and reproducing arrangements to record and play back an audio signal as a digital signal. In such arrangements an audio signal is converted to a digital signal by pulse code modulation (PCM) and then is recorded and later played back. In a typical studio recording, it is desirable to employ electronic editing for combining an already-recorded signal with a new signal. Generally, the PCM recording and reproducing arrangement carries out electronic assembly or insertion editing. One example of such electronic editing is disclosed in application Ser. No. 116,401 filed Jan. 29, 1980, and having a common assignee.

If the above electronic editing is performed on a recorded signal, errors will always be expected to be produced at the edit points, i.e., at the starting points and stopping points of the recording operation. When an error is produced only once in a predetermined length of the record medium, it can be corrected by using an error correcting code commonly recorded with the digital signal. However, if the editing is repeatedly carried out so that many edit points occur in a brief span, a corresponding number errors may be generated in that span, with the result that the errors are no longer correctable. Consequently, when the digital signal is played back, portions thereof where multiple editing has taken place will often be accompanied by a distinct audible "click". In order to combat this undesirable effect, the starting and stopping points of recording should be controlled during electronic editing, so that uncorrectable errors are prevented.

OBJECTS AND SUMMARY OF THE INVENTION

It is an object of this invention to provide a method and apparatus for editing digital signals, recorded on a record medium, in a fashion that avoids the problems of the prior art.

It is another object of this invention to provide a method and apparatus for editing digital signals in which the commencement and termination of recording is regulated during an edit operation.

It is further another object of this invention to provide a method and apparatus for editing digital signals in which generation of plural errors within any one specific group of digital words constituting an error-correcting code block is avoided, so that repeated editing operations can be carried out at the substantially same point on the record medium, or so that editing can be performed by connecting may short lengths of recorded signals, without generation of uncorrectable errors.

According to an aspect of this invention, the points on a record medium at which the same can be started or stopped (hereinafter respectively referred to as cut-in points or cut-out point) are regulated to prevent uncorrectable errors from being generated during editing. Where the associated error correcting code is capable of correcting m-tupple error, and an interleaving (or "error-spreading") technique is used to protect from so-called "burst" errors, the apparatus of this invention provides a control signal indicating permissible cut-in or cut-out points, in association with the interleaving of a recorded data sequence, so that less than $m+1$ errors occur as a result of any cut-in or cut-out operation.

The method and apparatus of this invention are suited for use where the recorded digital signal has been provided with error correction ability by processing the same, prior to recording, as a sequence of error correcting blocks formed of a plurality N of sequences of digital information words and n sequences of error correction words whose generating elements are constituted by words of the respective information word sequences, and achieving delay interleaving by providing for each of the N sequences of information words and n sequences of error correction words respective different delay times which are integral multiples of D block lengths. In such case, editing is carried out by reproducing the recorded digital signal from the record medium, providing an additional signal to be edited, mixing the reproduced digital signal, preferably in a digital cross-fader, to provide an edited digital signal, and recording the edited digital signal on the record medium. The timing of the commencement and termination of the recording of the edited digital signal is controllable to occur at points separated by a predetermined interval T to ensure that fewer than $m+1$ errors will be generated. More specifically, the predetermined interval can be longer than the largest of the respective different delay times so that an edit cut-in or cut-out is carried out only once for each span of the record medium carrying a given error correction word or words and the information words constituting its generation elements. Alternatively, the predetermined interval T is selected so that the least common multiple of T and D will be larger than the number of delay times D separating the words of a given error correcting block. In other words, for N information word sequences and n error correction word sequences, the least common multiple of T and D exceeds $(N+n-1)D$.

The above and other objects, features and advantages of this invention will be apparent from the following description taken in conjunction with the accompanying drawings.

DETAILED DESCRIPTION OF A PREFERRED EMBODIMENT

Digital recording techniques have been developed for recording signals, such as high fidelity audio, as a pulse code modulated (PCM) signal, and with such techniques the fidelity of the signal processing equipment is greatly enhanced and the reproduced signal is assured of the highest quality. However, digitized signals can be susceptible to burst errors caused by drop out which can occur in the recording and playback process. In order to protect the PCM signal from such burst errors, interleaving techniques have been developed. In one such technique, several successive words of the PCM data signal are used to generate an error-correcting code word. Then, the respective PCM data words and the error-correcting code word are spread by a delay interleaving technique to occur in different blocks on the record medium. In this manner, a burst error is likely to affect at most a single word in any error correcting block. Hence, when the PCM data words are reassembled into their original order, at most a single word will be in error, and such an error can be easily corrected.

Figure 1:
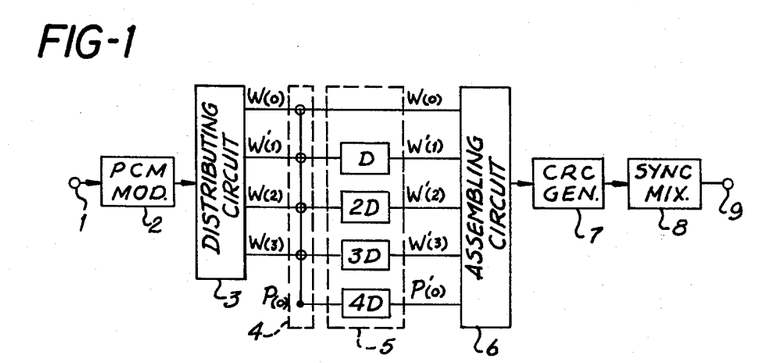
FIG. 1 is a block diagram showing one example of a PCM recorder for use with this invention.

One example of a simple encoding apparatus for carrying out the above interleaving is illustrated in FIG. 1.

As shown in FIG. 1, a single channel audio signal is applied to an input terminal 1 and thence to a pulse code modulator 2 where the signal is converted into an audio PCM signal. The modulator 2 is arranged to convert successive samples of the analog input signal into successive digital words $W_i$ by means of an analog to digital converter (not shown). The audio PCM signal is then passed from the modulator 2 to a distributing circuit 3 where it is cyclicly divided into four PCM data sequences $W(0)$, $W(1)$, $W(2)$, and $W(3)$. Each such data sequence includes every fourth word:

$W(0) = [W_0, W_4, W_8, \ldots]$
$W(1) = [W_1, W_5, W_9, \ldots]$
$W(2) = [W_2, W_6, W_{10} \ldots]$
$W(3) = [W_3, W_7, W_{11} \ldots]$ These four data sequences $W(0)$ to $W(3)$ are applied one word at a time to a modulo-two adder 4 to form a parity data sequence $P(0)$ to be used for error correction. The parity sequence $P(0)$, consisting of parity words $P_0$, $P_2$, $P_4$, $P_6$, ..., can be expressed as:

$$P(0) = W(0) \oplus W(1) \oplus W(2) \oplus W(3).$$

Each such parity word $P_0$, $P_2$, ... and the four words $W(0)$, $W(1)$, $W(2)$, and $W(3)$, forming the generating elements thereof constitute an error-correcting code block.

These sequences $W(0)$, $W(1)$, $W(2)$, $W(3)$, and $P(0)$, are supplied to an interleaving stage 5 which serves to interleave, or spread, each error-correcting block over a span of several transmission blocks. The interleaving stage 5 includes respective delay circuits having delay times of 0 words, D words, 2D words, 3D words, and 4D words so that different respective delays are imparted to each of the sequences $W(0)$, $W(1)$, $W(2)$, $W(3)$, and $P(0)$.

In a practical device, the interleaving stage 5 can be formed of a plurality of random access memories (RAMs), with the write-in addresses and the read-out addresses of each RAM controlled so that the appropriate delay time is provided by each. In such a case, the RAMs can be also served as the distributing circuit 3 as well as an assembling circuit 6 following thereafter and to be described below.

Figure 2:
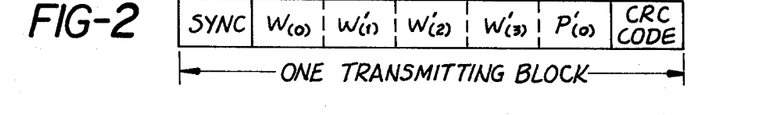
FIG. 2 shows a transmission block of an error-correction encoded signal of the above example.

At an output of the interleaving stage 5, interleaved data sequences $W(0)$, $W'(1)$, $W'(2)$, $W'(3)$, and $P'(0)$ are provided, and the assembling circuit 6 converts the five interleaved sequences $W(0)$, $W'(1)$, $W'(2)$, $W'(3)$, and $P'(0)$ into a series of recording blocks containing five words of the respective sequences. Following the assembling circuit, a CRC code generator 7 adds a cyclic redundancy check (CRC) code at the end of each block, and a synchronizing signal mixing circuit 8 adds a synchronizing word at the beginning of each block. Consequently, the transmitting blocks, as typically shown in FIG. 2, are provided in serial form at an output terminal 9.

The CRC code generator 7 can comprise, for example, a full adder circuit, and the least significant bits of a sum of the interleaved words of the transmitting block can be used as the CRC code. In a complementary decoding circuit, the CRC code is compared with the less significant digits of a sum of the received interleaved words for each block. If the CRC code and the less significant bits of the derived sum do not match, then all of the words for that block are provided with error pointer bits to identify the same as being erroneous. Thus, the CRC code is used as an error-detecting code.

Although not shown in FIG. 1, a modulator, a recording amplifier, and a recording head are coupled to the output terminal 9 so that the serial transmitting blocks are recorded one after another on a longitudinal track of a magnetic tape.

Figure 3:
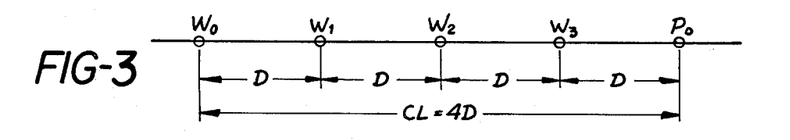
FIG. 3 is a chart for explaining delay interleaving in the apparatus of FIG. 1.

The effect of the delay separation of the respective words of each error-correcting block can be explained with respect to FIG. 3. If error correction encoding is carried out in the fashion described above, five words $W_0$, $W_1$, $W_2$, $W_3$, and $P_0$ forming a particular error-correcting code block are recorded on the longitudinal track of the magnetic tape with an interval of D blocks between timewise nearest ones thereof. Generally, the total length of the span of the tape track required to record all of the words of this code block is defined as a code sequence length CL. If any particular error-correcting code block is formed of N words of PCM data and n error-correcting words, and the delay time D is an integral number of transmitting block lengths, the code sequence length CL will span a distance $CL = (N + n - 1)D$ block lengths.

In the above example, CL=4D block lengths.

As parity words P(0) are used in the above example for error correction, up to a single erroneous word in each error correcting code block can be corrected, and burst errors having a length less than D transmitting blocks can be completely corrected if the above-described delay-interleaving technique is used. Certain error-correcting codes, such as the b-adjacent code, can correct more than one erroneous word in each error correcting code block. Thus, if such a code is used, burst errors exceeding the length D transmitting blocks can sometimes be completely corrected.

If the recording of the transmitting code blocks is interrupted for any reason, such as for inserting an edited signal, an error will be created in at least one transmitting block. In order to ensure that any errors created by such interruptions are entirely correctable, the cut-in and cut-out points for editing should be controlld so that, if multiple recording is carried out, burst errors are not created that can spread over a distance in excess of D transmitting blocks.

Figure 4A:
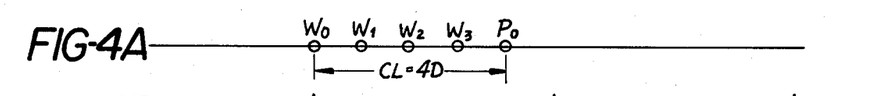
FIGS. 4A, 4B, 5A, and 5B are timing charts used for explaining embodiments of the method of this invention.
Figure 4B:
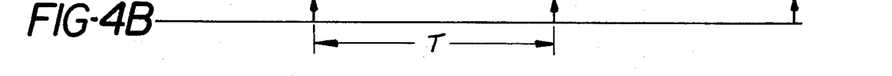

When a PCM digital signal is encoded to have the code sequence length CL of 4D blocks, as described above, and the number n of error correction sequences is selected as unity, then the editing cut-in and cut-out points can be selected to have an interval T therebetween which is greater than the code sequence length CL, as shown in FIGS. 4A and 4B. So long as the intervals T are greater than the code sequence length CL, the intervals T need not be equal to one another.

Figure 5A:
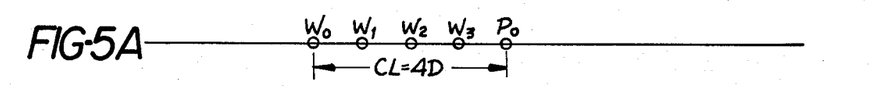
Figure 5B:
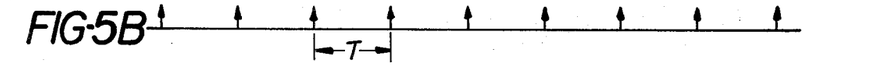

Alternatively, the cut-in and cut-out points can be controlled as illustrated in FIGS. 5A and 5B. So long as the respective words of any error-correcting code block are separated from each other by a regular spacing of D transmitting blocks (corresponding to a unit delay amount D), the controlled cut-in and cut-out points, as shown in FIG. 5B can be arranged so that the least common multiple of D and the interval T in the sequence of cut-in and cut-out points is longer than the code sequence length CL. When the interval T between the cut-in and cut-out point is selected as shown in FIGS. 5A and 5B, then the errors created upon interruption of the recorded signal by editing will coincide with at most a single word of any given error correcting block $W_0$, $W_1$, $W_2$, $W_3$, $P_0$.

Figure 6:
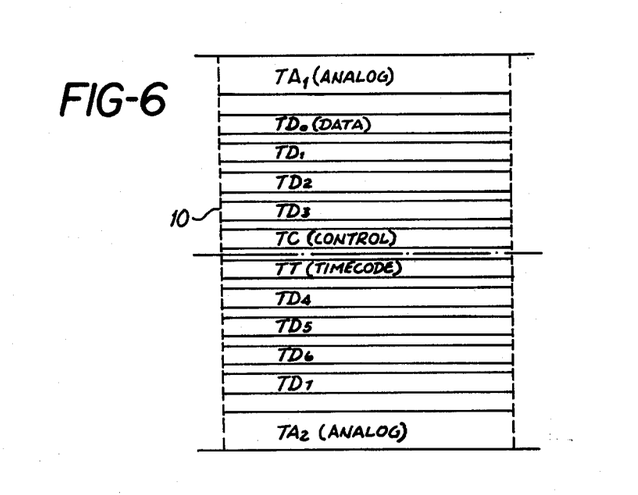
FIG. 6 shows a segment of a recorded magnetic tape used in conjunction with this invention.

One embodiment of recording and playback apparatus for carrying out recording of an edited signal according to this invention will now be described initially with reference to FIG. 6. In FIG. 6, a quarter-inch magnetic tape 10 has eight longitudinal data tracks $TD_0$ to $TD_7$ recorded thereon. A control track TC and time code track TT are recorded at a central portion of the tape, while analog tracks $TA_1$ and $TA_2$ are respectively recorded at edge portions of the tape 10.

These eight data tracks $TD_0$ to $TD_7$ are each recorded with respective audio PCM signals from eight channels $CH_1$ to $CH_8$. The analog tracks $TA_1$ and $TA_2$ can carry analog versions of the PCM signal, and are used for reference purposes, for example, to facilitate editing.

Figure 7A:
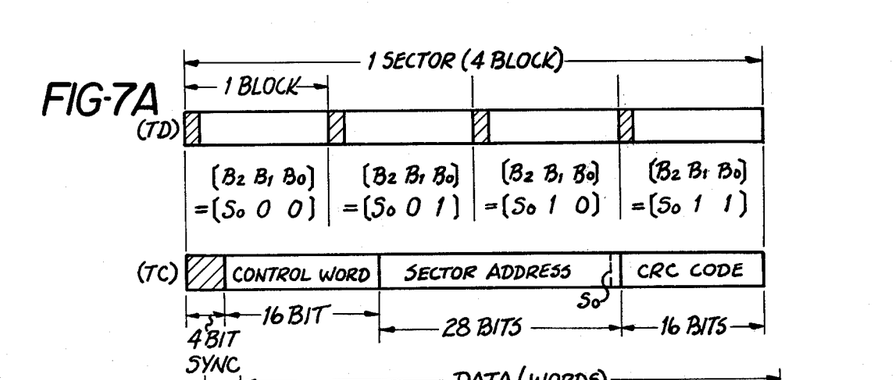
FIGS. 7A and 7B show a recording format for one embodiment of this invention.
Figure 7B:
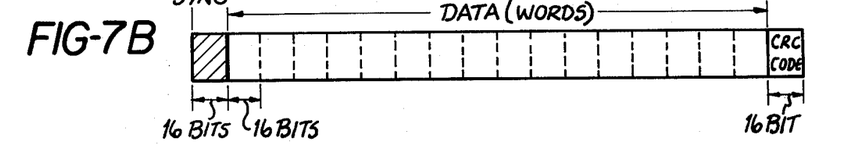

As shown in FIG. 7A, the data tracks $TD_0$ to $TD_7$ and the control track TC have the relationship as shown in FIG. 7A. In that view, a typical track TD is used to represent any of the tracks $TD_0$ to $TD_7$. The control track TC is formed of successive sectors, each corresponding to four blocks of the signal recorded in the data track TD. Each sector of the control signal includes a four-bit synchronizing word, a sixteen-bit control word, a twenty-eight bit sector address, and a sixteen-bit CRC code. The PCM signal recorded in the data track TD has a higher bit rate than the control signal, and each transmitting block is formed of an initial sixteen-bit synchronizing code word, sixteen sixteen-bit data words, and a following sixteen-bit CRC code word.

Contained within the synchronizing code word SYNC for each block of PCM data is a three-bit block address [$B_2$, $B_1$, $B_0$]. The most significant bit $B_2$ of each such sector address corresponds to the least significant bit $S_0$ of the respective sector address carried in the control signal. The remaining bits $B_1$ and $B_0$ of the block address change sequentially for the four blocks in each sector, so that, for each sector, the block addresses change cyclically:

$$[S_000], [S_001], [S_010], [S_011].$$

The control word contained in the control signal aids in discriminating the sampling frequency of the PCM audio signal recorded in the data track TD, and also identifies the recording format thereof. The sector address, an absolute address which increments from an initial 0, can be used to find a particular point of advancement along the tape. The CRC code can be used to verify the accuracy of the control word and the sector address for each sector of the control signal.

Three position modulation (3PM) or other high-density modulation technique is preferred for the recording of the data track TD. The control signal on the track TC can be recorded by using frequency modulation.

Figure 8:
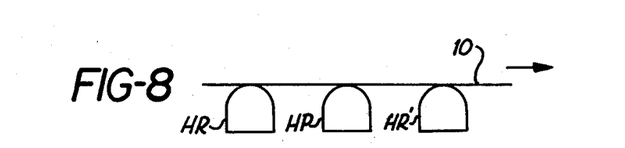
FIG. 8 is a schematic view of a tape head arrangement for use with this invention.

The arrangement of recording and playback head for each of the tracks $TD_0$ to $TD_7$ is shown in FIG. 8. A recording head HR, and playback head HT, and an additional recording head HR', are arranged one after the other in the direction of advancement of the magnetic tape 10. In practice, each head HR, HP, HR', has ten separate gaps and ten separate windings, with the gaps arranged in line across the magnetic tape 10 (i.e., in the transverse direction thereof). Of these gaps, eight gaps correspond to the data tracks $TD_0$ to $TD_7$, and the remaining two gaps correspond to the control track TC and the time code track TT. The analog tracks $TA_1$ and $TA_2$ are recorded by separate heads (not shown).

The initial recording on the magnetic tape 10 is carried out by using the recording head HR, while later recording, such as cut-in or cut-out editing, is carried out by using the recording head HR'.

The control track TC is formed only by the recording head HR, and it is recorded only when the tape is initially recorded. Thus, the control track TC is not re-recorded or otherwise revised as a result of any editing operation.

Figure 9:
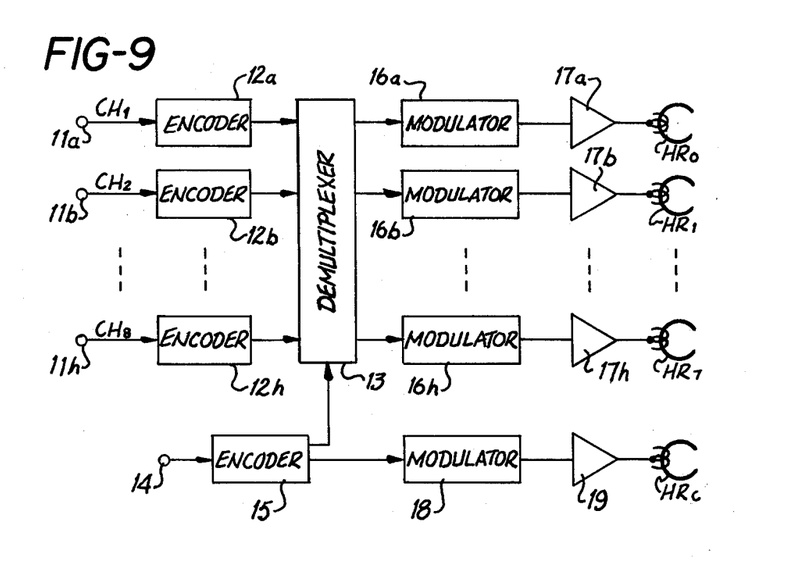
FIGS. 9 and 10 are block diagrams respectively showing the constructions of a recording arrangement and a reproducing arrangement used in conjunction with one embodiment of this invention.
Figure 10:
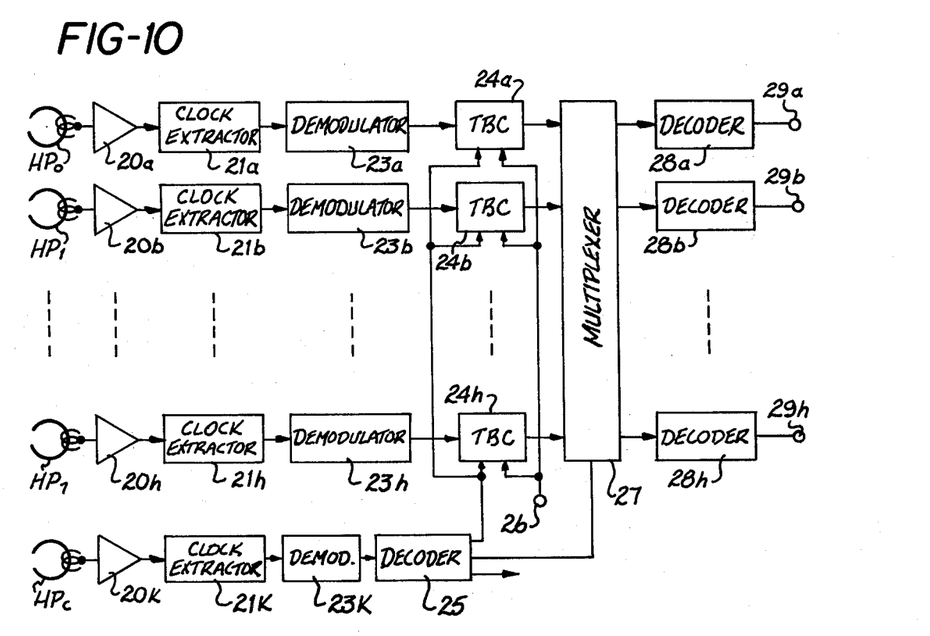

FIGS. 9 and 10 respectively show the structure of the recording and playback or reproducing arrangements for recording and playing back the PCM data in the eight data tracks $TD_0$ to $TD_7$.

In the digital recording arrangement of FIG. 9, the audio PCM signals of the eight channels CH1 to CH8 are supplied through input terminals 11a to 11h to respective encoders 11a to 11h. These encoders 12a to 12h each have generally the structure as described below with reference to FIG. 11, and include delay interleaving circuitry, parity signal generating circuitry, a CRC adding circuit, and a synchronizing signal mixing circuit, and produce error-correcting code blocks having parameters N=6 and n=2.

The transmitting blocks provided from the encoders 12a to 12h are then provided to a de-multiplexer 13 to produce eight data sequences. A discriminating signal is provided to a terminal 14 and thence to a control signal encoder 15. The control signal encoder 15 provides a timing signal to the de-multiplexer 13 to control the formatting carried out therein.

The de-multiplexer 13 then provides the eight data sequences in a predetermined format to modulators 16a to 16h and thence through respective recording amplifiers 17a to 17h to recording heads $HR_0$ to $HR_7$. In practice, the latter are actually the separate gaps on a single head HR, and thus are disposed in line across the magnetic tape 10.

When a single channel audio PCM signal is recorded on a single track, the de-multiplexer 12 is not strictly necessary. However, if a plurality of data tracks, e.g., two tracks or four tracks, are used for recording a single channel PCM audio signal, the de-multiplexer 12 is required to distribute the PCM data among the various tracks.

The recording of the control track TC is also carried out by the arrangement of FIG. 9. The control signal encoder 15 supplies the control signal of FIG. 7A to a modulator 18, and thence through a recording amplifier 19 to a control signal recording head $HR_C$.

The digital playback arrangement of FIG. 10 is generally complementary to the recording arrangement of FIG. 9, and includes data playback heads $HP_0$ to $HP_7$ and a control signal playback head $HP_C$, respectively in contact with the data tracks $TD_0$ to $TD_7$ and the control track TC. The respective picked-up data signals are provided from the heads $HP_0$ to $HP_7$ through respective playback preamplifiers 20a to 20h and clock extractor circuits 21a to 21h to demodulators 23a to 23h. The demodulated data signals are thence provided to respective time base corrector circuits 24a to 24h. The picked-up control signal is provided from the head $HP_C$ through a playback amplifier 20k and a clock extractor circuit 21k to a control signal demodulator 23k. The demodulated control signal is then provided to a control signal decoder 25.

The control signal decoder 25 provides a capstan control signal for a capstan servo (not shown), a format control signal, and write-in clock signals for controlling the memory addresses of the time base correctors 24a to 24h. More specifically, the sector address and block addresses derived from the control track TC and the synchronizing words in the data tracks $TD_0$ to $TD_7$ are used to define the write-in addresses for the time base correctors 24a to 24h. A reference clock signal is applied at a reference clock input 26 as a read clock signal to each of the time base correctors 24a to 24h. The time base correctors 24a to 24h then provide the sequence of blocks free from time base variation, and are supplied to a multiplexer 27. The latter serves to reformat the reproduced data from the eight tracks to a predetermined number of channels of data sequences, in this example, into eight sequences. Each of these sequences is then provided to a respective error correcting decoder 28a to 28h. Each decoder includes a CRC check circuit, de-interleaving circuitry, error correcting circuitry, and error compensating circuitry, as described in greater detail below with reference to FIG. 15. Finally, the reproduced audio PCM signals are provided at output terminals 29a to 29h.

Figure 11:
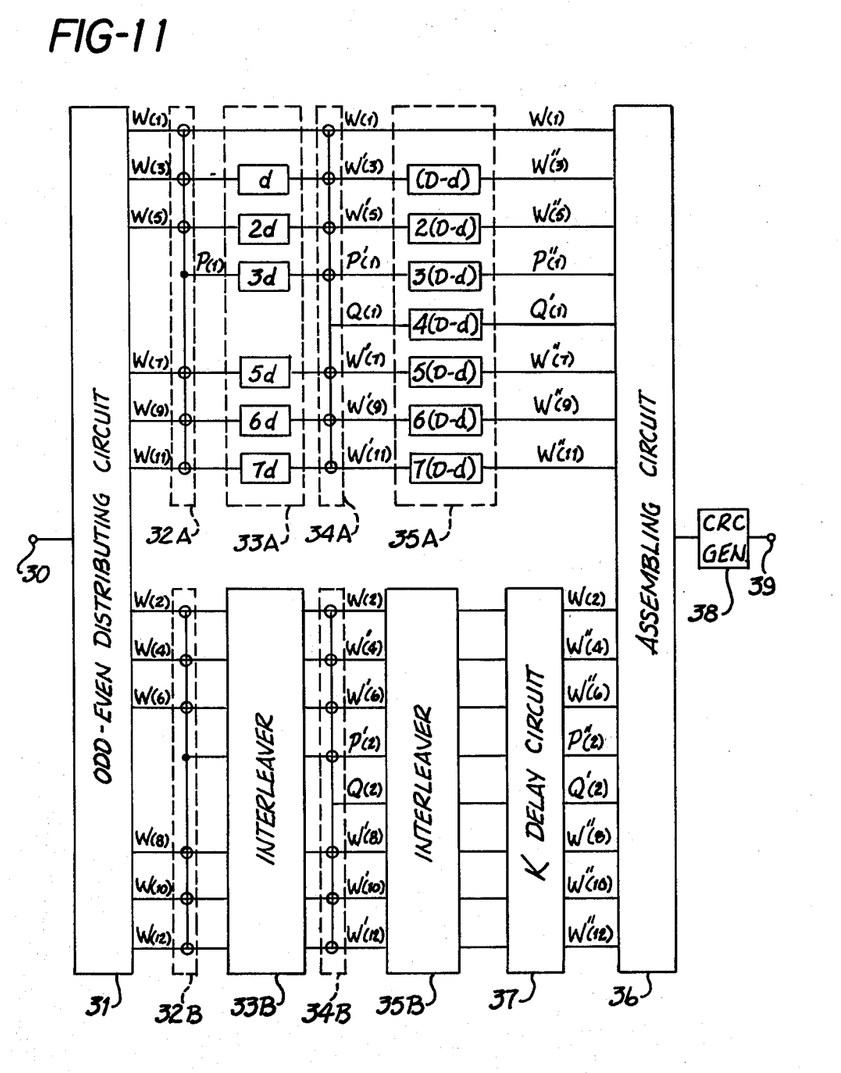
FIG. 11 is a block diagram showing the construction of an encoder provided in a practical recording arrangement.

The error correction encoders 12a to 12h of FIG. 9 can all have the same basic construction, and each is favorably arranged as illustrated in FIG. 11. As shown therein, a single channel PCM data sequence formed of successive digital words $W_i$ is applied through an input terminal 20 to an odd-even distributing circuit 31, where the PMC data sequence is divided into twelve data sequences. In this arrangement, the data sequences are distributed into two groups—namely, odd data sequences W(1), W(3), W(5), W(7), W(9), and W(11), each being composed of odd-numbered words, and even data sequences W(2), W(4), W(7), W(8), W(10), and W(12), each being composed of even-numbered words. The odd group of sequences W(1) to W(11) and the even group of sequences W(2) to W(12) are separately encoded for error correction.

Each of the data sequences includes every twelfth word as follows:

$$W(1) = [W_1, W_{13}, W_{25} \ldots]$$
$$W(3) = [W_3, W_{15}, W_{27} \ldots]$$
$$\ldots\ldots\ldots\ldots\ldots$$
$$W(11) = [W_{11}, W_{13}, W_{35} \ldots]$$
$$W(2) = [W_2, W_{14}, W_{26} \ldots]$$
$$W(4) = [W_4, W_{16}, W_{28} \ldots]$$
$$\ldots\ldots\ldots\ldots\ldots$$
$$W(12) = [W_{12}, W_{24}, W_{36} \ldots]$$

The odd data sequences W(1) to W(11) are applied one word at a time to a modulo-two adder 32A to form a parity data word sequence P(1). The parity word $P_1$, for example, can be expressed mathematically $$P_1 = W_1 \oplus W_3 \oplus W_5 \oplus W_7 \oplus W_9 \oplus W_{11}.$$

The six PCM data sequences and the parity data sequence P(1) are then applied to a delay interleaving stage 33A.

In the interleaving stage 33A, the sequences W(1), W(3), W(5), P(1), W(7), W(9), and W(11), are provided with respective delay times of 0 words, d words, 2d words, 3d words, 5d words, 6d words, and 7d words. The thus-interleaved sequences W(1), W'(3), W'(5), P'(1), W'(7), W'(9), and W'(11), are then applied to another modulo-two adder 34A to generate a second parity data word sequences Q(1). Then, the six odd data sequences W(1) to W'(11) and the parity data sequences P'(1) and Q(1) are all applied to another delay interleaving stage 35A. This interleaving stage 35A has delay circuits providing respective delay amounts of 0 words, (D−d) words, 2(D−d) words, 3(D−d) words, 4(D−d) words, 5(D−d) words, 6(D−d) words, and 7(D−d) words respectively to the sequences W(1), W'(3), W'(5), P'(1), Q(1), W'(7), W'(9), and W'(11) to provide the double-interleaved sequences W(1), W'''(3), W'''(5), P''(1), Q'(1), W'''(7), W'''(9), and W'''(11). These double-interleaved sequences are then all applied to an assembling circuit 36.

At the same time, the even sequences W(2) to W(12) are processed through a first modulo-two adder 32B to generate a first parity sequence P(2), a first delay interleaving stage 33B, which is essentially similar to the stage 33A, a second modulo-two adder 34B for generating a second parity data sequence Q(2), and a second delay interleaving stage 35B which is essentially similar to the stage 35A. The double-encoded data sequences W(2), W'''(4), W'''(6), P''(2), Q'(2), W'''(8), W'''(10), and W'''(12) are all applied to a K-word delay circuit before being applied to the assembling circuit 36. The K-word delay circuit serves to give each of the sequences W(2) to W'''(12) a constant delay amount of K words so that, after a double-interleave operation, the odd words and even words are distributed as far apart as possible. In that way, even if a large number of errors are generated near any particular cut-in or cut-out point during an edit operation, all of the errors can be effectively corrected or compensated.

Figure 12:
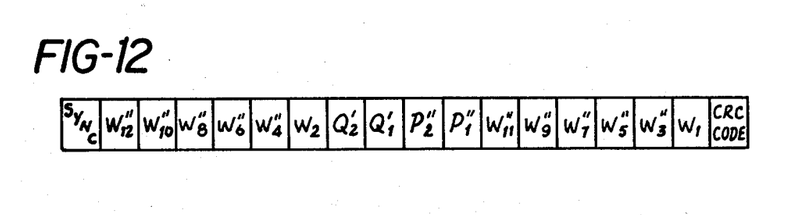
FIGS. 12, 13, 14A and 14B are charts used for explaining structure of the recorded digital signal and cross interleaving thereof in one embodiment of this invention.

The assembling circuit 36 assembles the sixteen double-interleaved sequences into transmitting blocks, and has a sixteen-bit synchronizing word at the beginning of each block, as shown illustratively in FIG. 12. A CRC code generator 38 adds a CRC check code of sixteen bits at the end of each transmission block, and the transmission blocks so constructed are provided at an output terminal 39.

Figure 13:
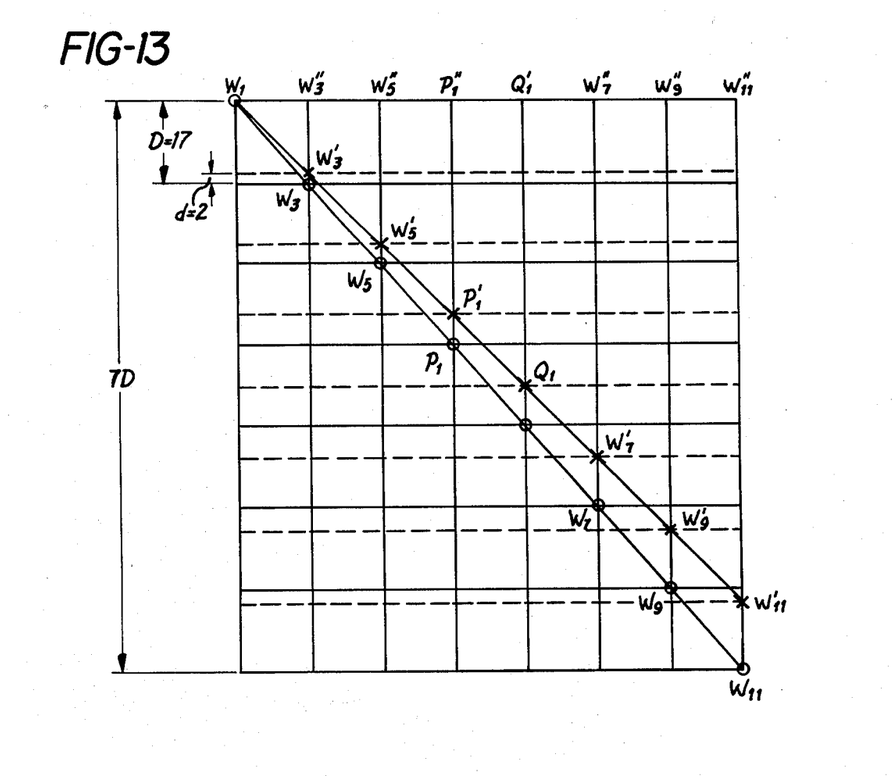

FIG. 13 is a chart illustrating the timing of the words of the error-correcting blocks formed at the first and second modulo-two adders 32A and 34A with respect to the timing of the double-interleaved words $W_1$, $W'''_3$, $W'''_5$, $P''_1$, $Q''_1$, $W'''_7$, $W'''_9$, and $W''_{11}$ that occur in the transmitting blocks. In FIG. 13, a circle indicates the words $W_1$, $W_3$, ... $W_{11}$ constituting the generating elements of the parity word $P_1$, while a cross indicates those words $W_1$, $W'_3$ ... $W'_{11}$, and $P'_1$ constituting the generating elements of the parity word $Q_1$. Here, the delay amounts D and d are selected to be 17 and 2 words, respectively, so that in the recorded transmitting blocks, the words of the first error-correcting block $W_1$, $W_3$, $W_5$, $P_1$, $W_7$, $W_9$, and $W_{11}$ are separated from one another by 17 blocks, while the words of the second error-correcting block $W_1$, $W'_3$, $W'_5$, $P'_1$, $Q_1$, $W'_7$, $Q'_9$, and $W'_{11}$ are separated from one another by $(D-d)=15$ blocks. Here, because the least common multiple of D and $(D-d)$ is 225 blocks, and thus exceeds the code length of $7D=199$ code blocks, only a single word is coincident among the two error-correcting blocks. Thus, if a particular word cannot be corrected by using one of the parity words $P_1$ and $Q_1$, there is a high probability that it can be corrected by using the other parity word.

Figures 14A, 14B:
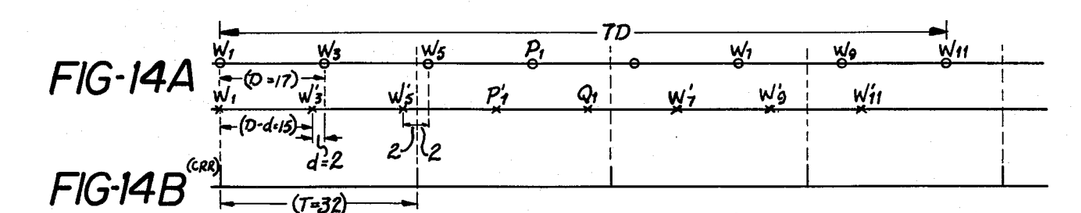

FIGS. 14A and 14B show the respective timings of the interleaved error-correcting blocks and of a signal CRR defining the times at which a recording operation during editing can commence or terminate. In this embodiment, the signal CRR can occur only at intervals T separated from one another by thirty-two blocks (corresponding to eight sectors). In this case, the greatest common multiple of T and either D or (D−d) exceeds the code sequence length CL of 7D blocks, and any errors generated during an editing process can be easily corrected.

Figure 15:
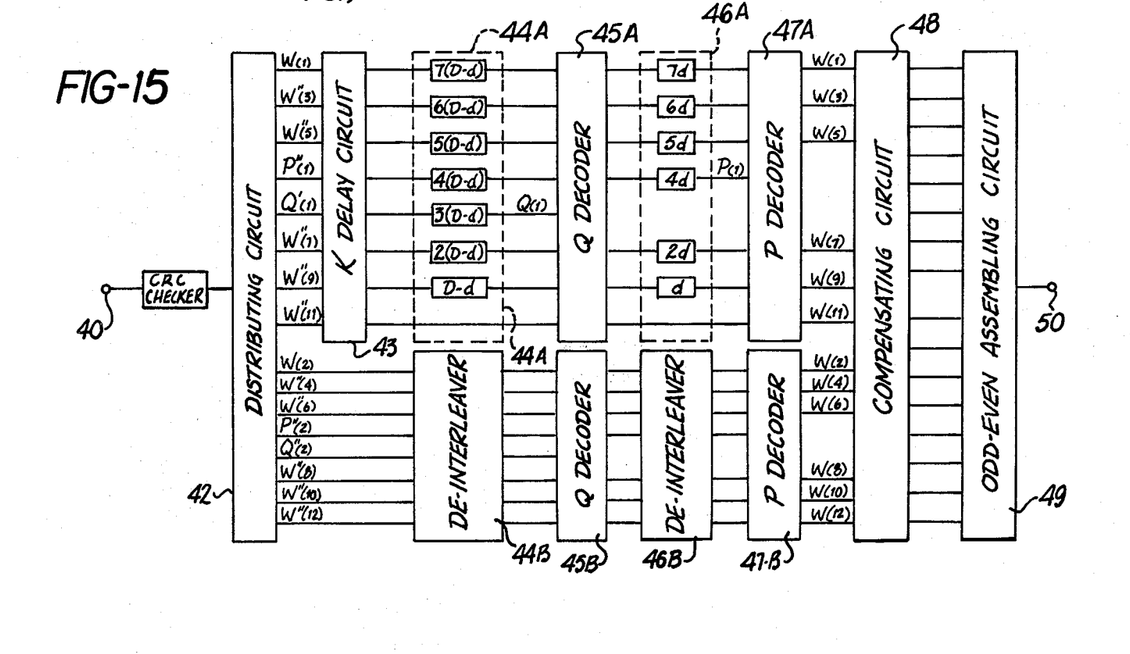
FIG. 15 is a block diagram showing the construction of a decoder provided in a practical reproducing arrangement.

FIG. 15 illustrates a practical error-correction decoder arrangement to be used as the respective decoders 28a to 28h of FIG. 10. This decoder arrangement is basically complementary to the error-correction encoder arrangement of FIG. 11, and receives the transmission blocks of the reproduced data signal at an input 40 thereof.

The received signal is supplied to a CRC checker circuit 41 which determines, for each block, whether that block contains any erroneous words. If the CRC checker circuit 41 determines that the block contains errors, then each of the sixteen data words thereof is provided with a pointer bit.

Thereafter, the checked signal is applied to a distributing circuit 42 which distributes the sixteen data words of each block into an odd group and an even group of sequences, respectively including the six PCM data sequences W(1) to W'''(11) and two parity data sequences P'''(1) and Q'(1), and the six PCM data sequences W(2) to W'''(12) and the two parity data sequences P''(2) and Q'(2). Following that, each of the odd and even groups is separately error-corrected. However, the odd sequences are first supplied to a K-word delay circuit 43 which provides a uniform delay to each of the odd sequences to compensate for the delay provided by the K-word delay circuit 37 of the encoder arrangement of FIG. 11. Then, the odd sequences are provided to a first de-interleaving stage 44A providing amounts of delay 7(D−d) words, 6(D−d) words, 5(D−d) words, ..., and 0 words to compensate for the respective delays imparted in the interleaving stage 35A of FIG. 11. Following this de-interleaving, the resulting data sequences are provided to a Q-decoder 45A where error correction is carried out using the second parity data sequence Q(1). Here, if a single word is in error, the erroneous word is corrected and the pointer bit associated therewith is corrected.

The corrected sequences W(1), W'(3), W'(5), P'(1), W'(7), W'(9), and W'(11) are furnished through a second de-interleaver stage 46A which imparts respective delays of 7d words, 6d words, 5d words, 4d words, 2d words, d words, and 0 words, thereto to compensate for the delay amounts imparted in the interleaving stage 33A of FIG. 11. Then, the de-interleaved sequences are applied to a P-decoder 47A where up to one word can be corrected by use of the parity sequence P(1), and if any word is corrected, the pointer bit associated therewith is cleared. Thereafter, the de-interleaved and corrected sequences W(1) to W(11) are applied to a compensating circuit 48.

The even group of sequences W(2), W'''(4), W'''(6), P''(2), Q'(2), W'''(8), W'''(10), and W'''(12), is applied through a de-interleaver stage 44B, a Q-decoder 45B, a second de-interleaver stage 46B, and a P-decoder 47B, so that de-interleaved corrected sequences W(2), W(4), W(6), W(8), W(10), and W(12), are also applied to the compensating circuit 48. The construction and operation of the de-interleaving stages 44B and 46B and of the Q-decoder 45B and P-decoder 47B are essentially the same as the corresponding elements 44A through 47A.

The compensating circuit 48 identifies any word containing uncorrectable error by determining the presence of a pointer bit. Then, if any such word is detected, an interpolating operation is carried out wherein a synthetic data word is created by calculating the average value of the data words representing sampled values immediately preceding and immediately following the word containing uncorrectable error. The interpolated word can then be substituted for the erroneous word. The technique of interpolating serves to make any uncorrectable errors inconspicuous, and is successful because of the generally high degree of correlation found within a PCM audio signal. The output of the compensating circuit 48 is then applied to an odd-even assembling circuit 49 which returns the twelve sequences W(1) to W(12) to serial form at an output terminal 50 thereof.

Figures 16, 17A:
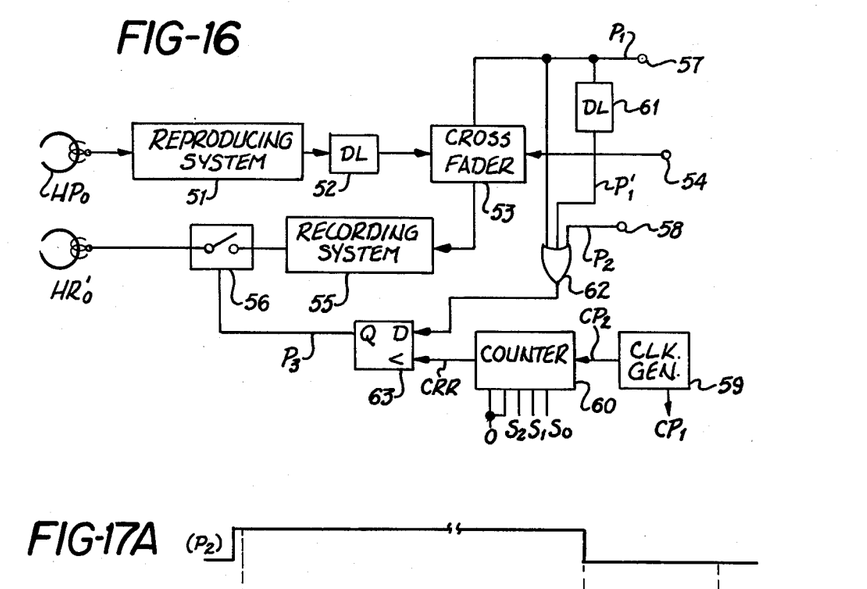
FIG. 16 is a block diagram of one embodiment of editing apparatus according to this invention.
FIGS. 17A–17F are time charts used for explaining the operation of the above editing apparatus.

FIG. 16 illustrates an embodiment of editing apparatus according to this invention. The editing apparatus of FIG. 16 is used in the editing of a PCM audio signal that has been previously recorded in the fashion described hereinabove. For the sake of simplicity, however, the arrangement of FIG. 16 is explained with reference to a single-channel audio PCM signal recorded on a single track $TD_0$. Further, for the same reason, insert edition is carried out only with respect to the one data track $TD_0$. However, it is to be understood that in a multi-track recording process, similar treatment would be given to each audio PCM signal recorded on each of the several tracks $TD_0$ to $TD_7$.

During an editing operation, the playback head $HP_0$ and the second recording head $HR'_0$, as shown in FIG. 8, are used. The picked-up audio PCM signal is provided from the playback head $HP_0$ to a reproducing system 51, which is generally constructed as illustrated above in FIG. 10. The reproduced audio PCM signal is then provided through a delay line 52 to one input terminal of a cross fader 53. A signal to be edited with the reproduced signal is applied at another input terminal 54 of the cross fader 53. An edited signal which is blended from the reproduced signal and the additional signal is provided from the cross fader 53 to a recording system 55, which can be constructed as shown above in FIG. 9. The edited signal is then provided through a controlled switch 56 to the editing recording head $HR'_0$.

The delay line 52 has a delay time corresponding to the distance between the two heads $HP_0$ and $HR'_0$ so that when the output of the playback head $HP_0$ is applied through the delay line 52, the cross fader 53, and the recording system 55 and the gate circuit 56 to the recording head $HR'_0$, and is recorded thereby on the tape 10, a signal exactly the same as the signal originally recorded on the tape will be re-recorded.

Although described in greater detail in copending application Ser. No. 116,401, the principles of operation of the cross fader 53 will be described briefly. The cross fader includes a multiplying-constant generator, which can be a digital counter, responsive to a start-edit control pulse to generate a multiplier constant $\alpha$. The constant $\alpha$ increases in a stepwise fashion from 0 to 1. A complementary generator circuit provides a complementary signal $(1-\alpha)$ which gradually changes from 1 to 0. In response to a stop-edit signal the constant $\alpha$ decreases gradually from 1 to 0 while the complementary signal progressively increases from 0 to 1.

The multiplier constant $\alpha$ is multiplied by the digital signal to be edited, while the complementary signal $(1-\alpha)$ is multiplied by the played back digital signal. The product signals of such multiplication are blended together to produce a mixed digital signal, and the mixed digital signal is applied from the cross fader to successive stages.

A cross-fader control pulse $P_1$ (FIG. 17B) is applied through a terminal 56 to the cross fader 53 and during the interval when the pulse $P_1$ is high or "1", the constant $\alpha$ increases slowly from 0 to 1 while the constant $(1-\alpha)$ decreases slowly from 1 to 0. A control command signal $P_2$ (FIG. 17A) controls the occurrence of the control pulse $P_1$ so that the latter occurs immediately following the rising of the control command signal $P_2$ to "1" and immediately following the falling thereof to "0". Here, the control command signal $P_2$ is also applied to a terminal 58.

A reference clock generator 59 generates clock pulses $CP_1$ of the sector frequency and clock pulses $CP_2$ of the block frequency. The clock pulses $CP_1$ and reproduced control signals are supplied to a capstan servo circuit (not shown) to control the rate of advancement of the tape 10. The clock pulses $CP_2$ are applied to a clock terminal of a 5-bit binary counter 60. The counter 60 is provided at loading input terminals thereof with initial zeros in the most significant bits and with the three least significant digits $[S_2, S_1, S_0]$ of the sector address of the reproduced control signal. The counter 60 is reset when the three digits $[S_2, S_1, S_0]$ are all "0". Thereafter, when thirty-two clock pulses $CP_2$ are supplied to the counter 60, a single ON/OFF control pulse CRR is provided at an output thereof.

In this embodiment, as the least significant bits of the sector address become "0" only once for each eight sectors, with one sector comprising four blocks, the control pulse CRR is generated once each thirty-two blocks. Accordingly, the timing of the control pulse CRR in relation to the PCM data is in a constant relationship as illustrated above in FIGS. 14A and 14B.

The opening and closing of the switch 56 is controlled by the arrangement including a delay line 61, and OR circuit 62, and a D-type flip flop 63. The flip flop 63 has a clock input connected to the counter 60, a D-input connected to the OR gate 62, and an output Q coupled to a control terminal of the switch 56. The terminal 57 is coupled directly to one input of the OR gate 62, is also coupled through the delay line 61 to another input thereof, while the terminal 58 is coupled to a third input of the OR gate 62. The cross fader control pulse $P_1$, a pulse $P_1'$ (FIG. 17C) produced by passing the pulse $P_1$ through the delay line 61, and the command control signal $P_2$ are all supplied to the OR gate 62 so that the output of the OR gate 62 is "1" during an entire editing operation. The control pulse CRR supplied to the clock terminal of the flip flop 63 causes the latter to provide a record ON/OFF signal $P_3$ to the switch 56 so that the recording by the head $HR'_0$ will commence and terminate precisely at the predetermined spots on the tape separated from one another by the aforementioned period T.

Figure 17B:
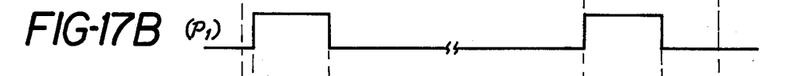
Figure 17C:
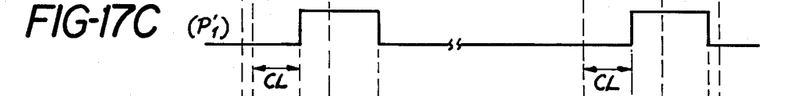

The operation of the circuit of FIG. 16 can be explained with reference to FIGS. 17A through 17F. The control command signal $P_2$ is made "1" or high to start a cut-in operation and is made "0" or low to start a cut-out operation, as shown in FIG. 17A. The cross-fader control pulse $P_1$ is made "1" or high for a period from a time $t_2$ to a time $t_4$ following the onset of the control command signal $P_2$ and for a similar period from a time $t_6$ to a time $t_8$ at the termination thereof, as shown in FIG. 17B. The delayed pulse $P_1'$ is "1" or high for a period from a time $t_3$ to a time $t_5$ and for a period from a time $t_7$ to a time $t_9$ following the onset and termination of the control command signal $P_2$, as shown in FIG. 17C.

Figures 17D, 17E:
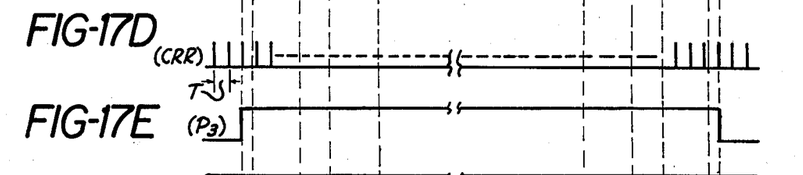

ON/OFF control pulse CRR is provided, as shown in FIG. 17D, at a period of T=32 blocks, to the clock input of the flip flop 63. The latter is conditioned to be turned on whenever any of the control command signal $P_2$ or the pulses $P_1$ and $P_1'$ is "1", and is conditioned to be turned off whenever the last of the signal $P_2$ and the pulses $P_1$ and $P_1'$ returns to "0". Thus, as shown in FIG. 17E, the output Q of the flip flop 63 provides the record ON/OFF signal $P_3$ from a time $t_1$ at the first control pulse CRR following the onset of the signal $P_2$ until a time $t_{10}$ following the return at time $t_9$ of the pulse $P_1'$ to zero.

Figure 17F:
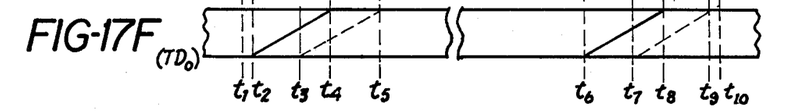

Thus, with the embodiment of FIG. 16, digital data is insert edited as shown in FIG. 17F. First, at cut-in, the recording gate 56 is closed at the time $t_1$ to commence the recording by the head $HR'_0$. Until the time $t_2$, the played-back signal is recorded. Then at the time $t_2$, the cross fading operation begins. During the interval between the times $t_2$ to $t_4$ a cross-faded signal, as represented by a slant line, is recorded. The cross-fading technique can render inconspicuous any discontinuity, such as level skip at the junction of two audio signal. Because of the delay line 61, which imparts a delay of one code sequence length $CL=7D$, the interleaved data words of cross faded signal are recorded throughout the interval between the times $t_3$ to $t_5$, as shown by the slant dashed line.

When the record command control signal $P_2$ becomes "0" at the time $t_6$, a cut-out cross fading operation takes place during the interval between the times $t_6$ to $t_8$. The interleaved words of the cross-faded signal are also recorded during the interval between the times $t_7$ to $t_9$. Thereafter, from the time $t_9$ until the time $t_{10}$, the played-back signal is recorded substantially exactly as it was previously recorded. Then at the time $t_{10}$, the recording gate 56 is opened, and the recording operation is terminated. Thus, beginning at the time $t_{10}$, the recorded data signal $TD_0$ is left unchanged.

In the above embodiment, the ON/OFF control pulse CRR is generated at every $T=32$ blocks, so that the relation between the pulse CRR and recorded data is that shown in FIGS. 14A and 14B. That is, the cross-interleaved words $W_1$-$W_{11}$ forming generating elements for the first parity data word $P_1$ are distributed at an interval $D=17$ blocks. Also, the cross-interleaved words $W_1$-$W_{11}'$ forming generating elements for the second parity data word $Q_1$ are distributed at an interval of $(DOd)=15$ blocks. Therefore, if a transmitting block including $W_1$ is coincident with control pulse CRR when the latter is generated with an interval $T=32$ blocks, a transmitting block including any other word $W_3$-$W_{11}$ will not be coincident with any pulse CRR. In addition, since $2D=34$ blocks and $2(D-d)=30$ blocks, the control pulses CRR and transmitting blocks including any another words $W_3$-$W_{11}$ or $W_3'$-$W_{11}'$ will be spaced from each other by at the least two blocks. Therefore, even if an error occurs in a relation between control pulse CRR and recorded data due to stretching of the magnetic tape, jitter and the like, disturbance of the error correction ability of the edited signal is unlikely to occur.

In FIG. 17, intervals $t_2$-$t_4$ and $t_3$-$t_5$ (as well as intervals $t_6$-$t_8$ and $t_7$-$t_9$) will not necessarily overlap each other when the code sequence length CL is longer than the cross-interleaving period. In such a case, an additional delay line can be included and coupled to the OR-gate 62 so as to avoid an interval of "0" between the "1" periods of the pulses $P_1$ and $P_1'$.

As is apparent from the description of above embodiment, plural words and related error correcting code words are block encoded. When the data contained in one code block are interleaved and then recorded, even though the cut-in or cut-out operation is repeated at the same point, the errors that accompanying the changeover of recording and reproducing at the edit point will not exceed the maximum that can be corrected. For example, if a transmitting block including PCM word $W_1$ is judged by CRC to include an error due to the first cut-in operation and the word $W_1$ became erroneous, the second and following cut-in operations carried out at the same place will affect only the block containing the word $W_1$, and will not affect any of the other data words or parity words in the same error correcting block as the word $W_1$. That is, since the ON/OFF control pulse CRR is formed on the basis of the sector address recorded on the control track TC, even in the second and following editions, the pulse CRR will be generated with the identical phase as in the first edition. It is also possible that not only the sector address but also a signal in a constant relation with recorded data (such as data address, control signal, or the like) can used to form the ON/OFF control pulse CRR.

While this invention has been described with reference to a multiple-stationary-head tape apparatus, it should be understood that this invention could also be applied to a single-head stationary PCM recorder, or to a single- or multiple-rotating head PCM recorder.

Also, the error-correcting code is not limited to the parity code described above, but can be a full-adder code, a b-adjacent code, or other suitable error-correcting code. The b-adjacent code has the advantage that it enables correction of up to two erroneous words in any one block, so that two word errors can be generated in a cut-in or cut-out operation without adversely affecting the quality of the edited signal.

While an illustrative embodiment has been described hereinabove with reference to the accompanying drawings, it is to be understood that the invention is not limited to those precise embodiments, and that various changes and modifications may be effected therein by one skilled in the art without departing from the scope or spirit of the invention as defined in the appended claims.

I claim:

1. A method of editing digital signals recorded on a record medium, wherein said recorded digital signals have been encoded for correction of multiple error by processing the signals, prior to recording, as a sequence of error correcting blocks formed of a plurality of sequences of digital information words, at least one sequence of error correction words being inserted therein, generating elements of which are formed of words of the respective information word sequences, interleaving the sequences of information and error correction words by imparting different respective delays thereto which are integral multiples of a predetermined delay amount, and forming recording blocks of the interleaved words so that each word of said at least one error correction word sequence and the words constituting the generating elements thereof are spaced from nearest ones thereof by a predetermined number of such recording blocks; comprising the steps of reproducing said recorded digital signal from said record medium;

providing an additional digital signal to be edited;

mixing the reproduced digital signal and the additional digital signal to provide an edited digital signal; and recording the edited digital signal on said record medium; wherein the step of recording includes commencing and ending the recording of the edited digital signal at predetermined points selected so that if multiple editing is carried out, fewer than $(m+1)$ errors will be generated.

2. A method of editing digital signals according to claim 1, wherein successive ones of said predetermined points are separated from one another by an equal amount such that the least common multiple of such amount and the length of said record medium corresponding to said predetermined delay amount is greater than the length of said record medium corresponding to an interleaved error correction block including the at least one error correction word and the digital information words constituting the generating elements thereof.

3. A method of editing digital signals according to claim 2, wherein said length corresponding to said interleaved error correction block equals $(N+n-1)D$, where N is the number of said sequences of digital information words, n is the number of sequences of error correction words, and D is the distance, in recording blocks, between said nearest ones of the error correction words and the words forming the generating elements thereof.

4. A method of editing digital signals according to claim 1, wherein successive ones of predetermined points are separated by an amount corresponding to a length of said record medium thereof corresponding to an interleaved error correction block including the at least one error correction word and the digital information words constituting the generating elements thereof.

5. Apparatus for editing digital signals recorded on a record medium wherein said recorded digital signals have been encoded for correction of multiple errors by processing the signal, prior to recording thereof, as sequences of error correcting blocks formed of a plurality of sequences of digital information words, at least one sequence of error correction words being inserted therein, generating elements of which are formed of words of the respective information word sequences, the information and error correction word sequences being interleaved by having respective different delays imparted thereto that are integral multiples of a predetermined delay amount, so that recording blocks are formed of the interleaved information and error correction words, and, on the record medium, each such error correction word and the information words constituting the generating elements thereof are spaced from nearest ones thereof by a predetermined plurality of such recording blocks; the apparatus comprising means for reproducing said digital signals from said record medium;

means for providing an additional digital signal to be edited;

means for mixing the reproduced digital signals and the additional signal to provide an edited signal;

means for recording the edited digital signal on said record medium; and timing means for timing the commencement and termination of the recording of the edited digital signal to occur at predetermined points selected so that when editing is carried out, fewer than $(m+1)$ errors will be generated.

6. Apparatus for editing digital signals according to claim 5, wherein said timing means includes means generating a control signal at a predetermined interval to control the commencement and termination of the recording of the edited digital signal.

7. Apparatus for editing digital signals according to claim 6, wherein said predetermined interval is greater than the largest of said respective different delays.

8. Apparatus for editing digital signals according to claim 6, wherein said respective different delays differ from one another by integral multiples of a number D of block lengths, and said predetermined intervals are selected to correspond to T block lengths such that the least common multiple of D and T is greater than the number of block lengths spanned by the digital information words and error correction words constituting an error correcting block.

9. Apparatus for editing digital signals according to claim 8, wherein there are N sequences of digital information words and n sequences of error correction words, and the least common multiple of D and T is greater than $(N+n-1)D$.

10. Apparatus for editing digital signals according to claim 6, wherein said means for generating a control signal includes means deriving from said medium a timing signal related to a predetermined number of said block lengths.

11. Apparatus for editing digital signals according to claim 10, wherein said recorded digital signals are recorded in one or more data tracks on said record medium, and sector address signals, comprising a plurality of bits and incrementing correspondingly with advance of said medium, for identifying particular groups of blocks of the recorded digital signals, are recorded in a separate track on said record medium; and said means for generating a control signal includes counter means having preset terminals coupled to receive a plurality of the less significant bits of the sector address signals and providing an output when the contents of said counter of said counter means equal a predetermined value, clock generator means providing pulses at the frequency of the blocks of the digital signal to said counter means to decrement the contents thereof, and switching means controlling the coupling of said edited signal to said means for recording in response to said output of said counter means.

12. Apparatus for editing digital signals according to claim 11, where said switching means includes D-type flip flop means having a clock input coupled to said counter means, a D input, and an output; OR-gate means having an output coupled to said D input, one input coupled to receive an edit control signal, and another input, and a delay line having an input coupled to said one input of the OR-gate means and an output coupled to said other input of said OR-gate means.

13. Apparatus for editing digital signals according to claim 5, wherein said means for mixing the reproduced signal and the additional digital signal includes cross fader means for gradually digitally blending such signals to provide a cross-faded digital signal as said edited signal.

* * * * *